P. STEENFELDT-LINDHOLM.
DRYING OR COOLING APPARATUS.
APPLICATION FILED MAR. 11, 1919.
1,353,358. Patented Sept. 21, 1920.
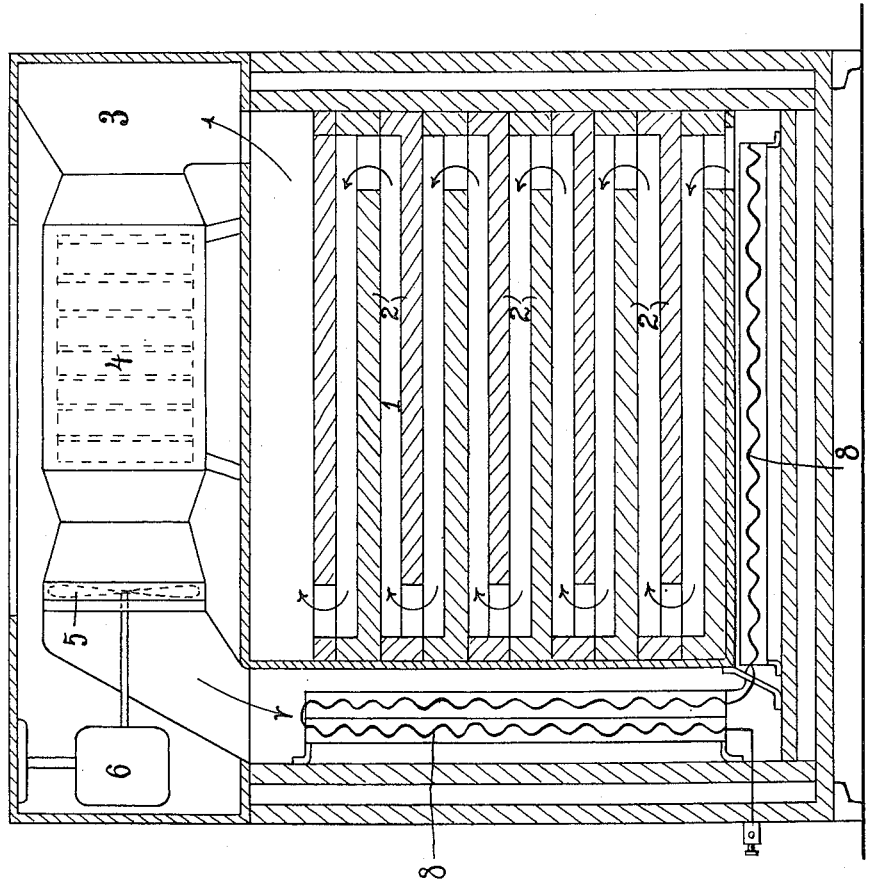
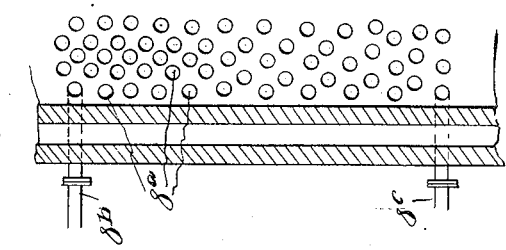
Inventor
Peter Steenfeldt-Lindholm
by Laurence Langner
Attorney

UNITED STATES PATENT OFFICE.

PETER STEENFELDT-LINDHOLM, OF CHRISTIANIA, NORWAY.

DRYING OR COOLING APPARATUS.

1,353,358.  Specification of Letters Patent.  Patented Sept. 21, 1920.

Application filed March 11, 1919. Serial No. 281,993.

*To all whom it may concern:*

Be it known that I, PETER STEENFELDT-LINDHOLM, of Villa "Paulun," Ö. Aker, Christiania, Norway, have invented certain new and useful Improvements in Drying or Cooling Apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object a drying or cooling apparatus or cupboard in which the air is circulated by means of an electrically driven fan or ventilator in a closed circuit between a heating or cooling chamber for the circulating air, a storing chamber containing the goods to be treated and a chamber containing a hygroscopic medium.

According to a preferred form of the invention the same consists of a cupboard containing a large storing room provided with shelves for the drying goods, and through which the air moves in zig-zag. Above this room is arranged a chamber containing the drying apparatus and the circulating fan, and at one side of the storing room is located a channel, containing elements to heat or cool the air.

An embodiment of the invention is illustrated in the accompanying drawing, in which Figure 1 is a vertical sectional view showing the apparatus equipped with electrical heating means; and Fig. 2 is a fragmental sectional view showing the use of cooling means in place of a heater.

The apparatus comprises a storing room for the goods undergoing treatment provided with shelves or drawers 2 forming between them a zig-zag or tortuous channel for the circulating air.

Above the storing room 1 is located a chamber 3 in which are arranged a drier 4 of any known type, preferably containing hygroscopic material, and a fan or ventilator 5, the latter being driven by an electric motor 6 and acting to draw the air through drier 4 and force it into the channel 7, as indicated by the arrows in Fig. 1, said channel 7 being disposed at one side of and below the storing room 1. This channel 7 contains the devices for bringing the circulating air to the desired temperature, such devices being shown in Fig. 1 as in the form of suitable resistance elements 8 supplied with current through the wires $8^1$ and $8^2$, and in Fig. 2 as in the form of a series of cooling tubes $8^a$ having inlet and outlet connections $8^b$ and $8^c$ for the cooling fluid. From the channel or chamber 7 the air is introduced in a dry condition, and either heated or cooled, into the storing room 1, where it passes over the goods on the shelves 2.

I claim:

1. In a drying apparatus or cupboard, the combination with a storing room provided with shelves for the drying goods, said shelves being arranged so as to form between them a zig-zag channel, of a drying room arranged above said storing room and containing hygroscopic material, and a room containing devices for bringing the air to the desired temperature, located on one side and below the storing room.

2. In a drying apparatus or cupboard, the combination with a storing room having shelves for the goods to be treated, said shelves arranged so as to form a zig-zag channel through said storing room, of a drying room arranged above said storing room and containing hygroscopic material, and a room containing devices for heating the air, located at one side of and below the storing room.

In testimony that I claim the foregoing as my invention, I have signed my name in presence of two subscribing witnesses.

PETER STEENFELDT-LINDHOLM.

Witnesses:
  AUGUST BUGGE,
  NANCY ASLAKSEN.